United States Patent [19]
Elliott et al.

[11] Patent Number: 4,678,973
[45] Date of Patent: Jul. 7, 1987

[54] SENSORLESS STARTING CONTROL FOR A BRUSHLESS DC MOTOR

[75] Inventors: James O. Elliott, Beavercreek; Michael B. Monahan, West Carrolton, both of Ohio

[73] Assignee: General Motors Corporation, Detroit, Mich.

[21] Appl. No.: 916,369

[22] Filed: Oct. 7, 1986

[51] Int. Cl.$^4$ .............................................. H02P 6/02
[52] U.S. Cl. .................................. 318/254; 318/138; 318/439; 318/272
[58] Field of Search ............... 318/138, 254, 439, 430, 318/431, 756, 778, 272

[56] References Cited

U.S. PATENT DOCUMENTS

| | | | |
|---|---|---|---|
| 4,262,236 | 4/1981 | Gelenius et al. | 318/138 |
| 4,403,177 | 9/1983 | Weber et al. | 318/254 |
| 4,431,953 | 2/1984 | Schray et al. | 318/254 |
| 4,595,865 | 6/1986 | Jahns | 318/254 |
| 4,603,283 | 7/1986 | Oltendorf | 318/254 |

FOREIGN PATENT DOCUMENTS 2604638 8/1977 Fed. Rep. of Germany ...... 318/138

Primary Examiner—William M. Shoop, Jr.
Assistant Examiner—Bentsu Ro
Attorney, Agent, or Firm—Mark A. Navarre

[57] ABSTRACT

A sensorless control system for reliably starting a brushless DC motor even when the motor/load inertia is relatively high and even though the rotor may be rotating in the wrong direction when starting is initiated. The line-to-line generated voltages of two deenergized stator windings are compared as a given stator winding is energized. The energization is either interrupted or permitting to continue depending on the comparison. If the comparison indicates that the rotor is turning in the correct direction, the energization is continued to produce synchronous positive torque for accelerating the rotor in that direction. If the generated voltage comparison indicates that the rotor is turning in the wrong direction, the winding energization is interrupted, and the next sequential winding is energized. The interruption occurs in alternate windings of the energization sequence, effectively reversing the energization sequence to generate substantially maximum synchronous braking torque for bringing the rotor substantially to a stop, whereafter starting may be attempted again.

2 Claims, 7 Drawing Figures

SENSORLESS STARTING CONTROL FOR A BRUSHLESS DC MOTOR

This invention relates to a controller for reliably starting a brushless DC motor without the use of a rotor position sensor.

In general, brushless DC motor control involves sequential energization of the stator or phase windings in relation to the rotor position to develop positive motor torque for driving a load. Information concerning the rotor position is either directly detected with a dedicated sensor such as an optical encoder or Hall Effect devices, or inferred from the voltages induced in the stator windings. Controllers in which the rotor position information is inferred are generally referred to as sensorless controllers.

The drawback with sensorless controllers is that the level of the generated voltages is related to the rotor speed, and the motor must somehow be started before the voltages are sufficiently great to enable the rotor position information to be reliably inferred. It is to this aspect of motor control that the present invention is primarily directed.

Typically, sensorless starting is effected by stepping the stator winding energization sequence in an open loop manner at a progressively increasing rate. When the generated voltages are sufficiently great, the open loop stepping in inhibited, and the motor is synchronously accelerated to its running speed. However, when the stepping is random in relation to the rotor position (that is, no pre-positioning of the rotor), the rotor is just as likely to start in the reverse direction as the forward direction. This results in prolonged starting attempts, which may be unacceptable.

The starting difficulties referred to above are worsened in situations where the motor/load inertia is relatively high, and where the rotor may be rotating in the wrong direction when starting is attempted. Both situations are present in the case of an automotive engine cooling fan motor. The motor is operated in intermittent duty, and may freewheel in the reverse (wrong) direction when deenergized due to air flow across the fan blades.

The primary object of the present invention is to provide an improved sensorless control system which reliably starts a brushless DC motor even when the motor/load inertia is relatively high and even though the rotor may be rotating in the wrong direction when starting is initiated. This object and other related objects are carried forward by comparing the line-to-line voltages of two deenergized stator windings as a given stator winding is energized, and either interrupting the energization or permitting the energization to continue, based on the comparison.

If the generated voltage comparison indicates that the rotor is turning in the correct (forward) direction, the energization is continued to produce synchronous positive torque for accelerating the rotor in the forward direction. The line-to-line comparison yields early information concerning the advancement of the energization sequence, permitting substantial filtering of the generated voltages for electrical noise immunity. This is especially significant when the applied voltage is chopped to limit the winding current since the chopping introduces a substantial amount of electrical noise.

If the generated voltage comparison indicates that the rotor is turning in the wrong (reverse) direction, the winding energization is interrupted, and the next sequential winding is energized. Whether the wrong rotation is due to freewheeling or the initial generation of torque in the wrong direction, the energization interruption occurs in alternate windings of the energization sequence, effectively reversing the energization sequence. This generates synchronous braking torque for bringing the rotor substantially to a stop, whereafter starting may be attempted again.

A controller according to this invention is thereby effective to satisfactorily start brushless motors having a relatively high load inertia even though the rotor and load may be turning in the wrong direction when starting is initiated. Although described in the context of a unidirectional application, this invention is equally appropriate in applications where bidirectional motor rotation is required. In either application, there is a desired direction of rotation and a wrong direction of rotation, and a controller according to this invention will operate as described above to produce synchronous braking torque whenever rotation in the wrong direction is detected.

IN THE DRAWINGS

Figure 1:
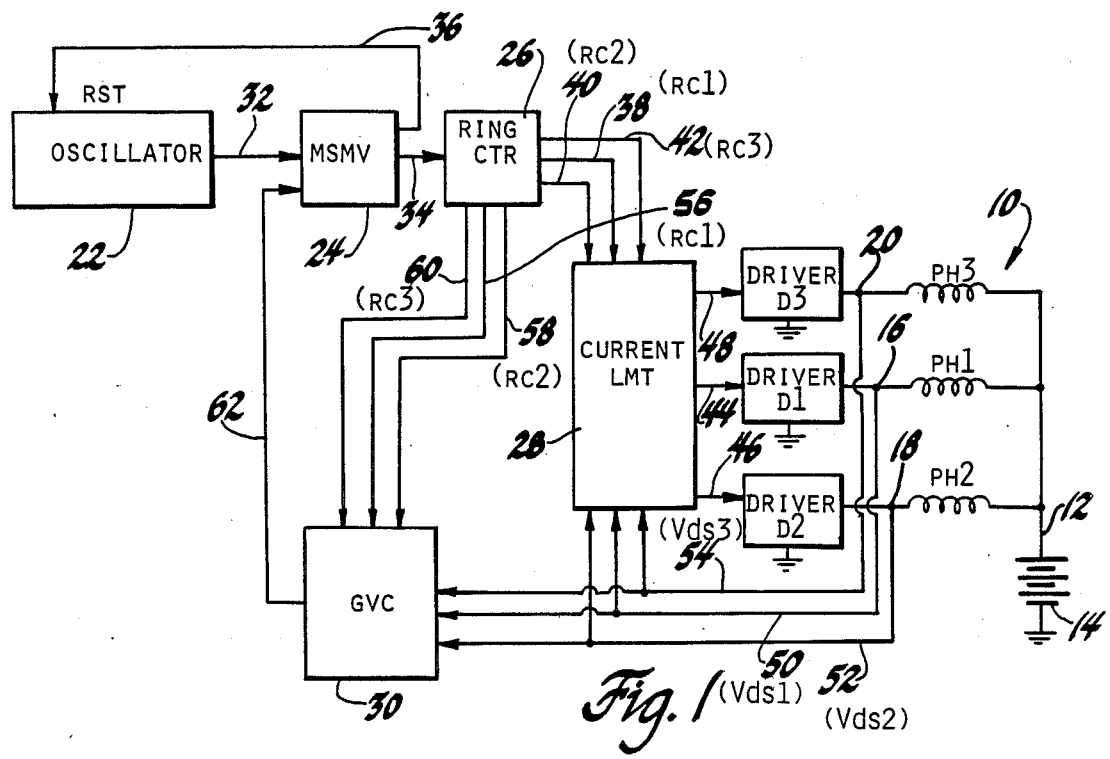
FIGS. 1-5 are circuit diagrams of a sensorless motor controller according to this invention.

Referring now to the drawings, and more particularly to FIG. 1, the reference numeral 10 generally designates the stator or phase windings PH1, PH2, and PH3 of a three-phase brushless DC motor. The motor includes a permanent magnet rotor (not shown) which is adapted to rotatably drive a mechanical load, such as an automotive engine cooling fan.

The phase windings PH1-PH3 are connected in a WYE configuration, the center of the WYE being connected via line 12 to the positive terminal of an automotive storage battery 14. The negative terminal of battery 14 is connected to the vehicle ground, and the Drivers D1-D3 are adapted to selectively connect phase winding terminals 16-20 to ground potential to complete the respective winding energization circuits through battery 14. The drivers D1-D3 are depicted in detail in the circuit diagram of FIG. 2.

The phase windings PH1-PH3 are energized in accordance with this invention so as to reliably start the brushless DC motor and drive its rotor in the desired direction. As indicated above, the preferred embodiment of this invention contemplates the rotor driving an engine cooling fan. In such application, the direction of rotation which effects engine cooling is designated as the desired or forward direction of rotation, and the opposite direction of rotation is designated as the reverse or wrong direction of rotation.

Figure 5:
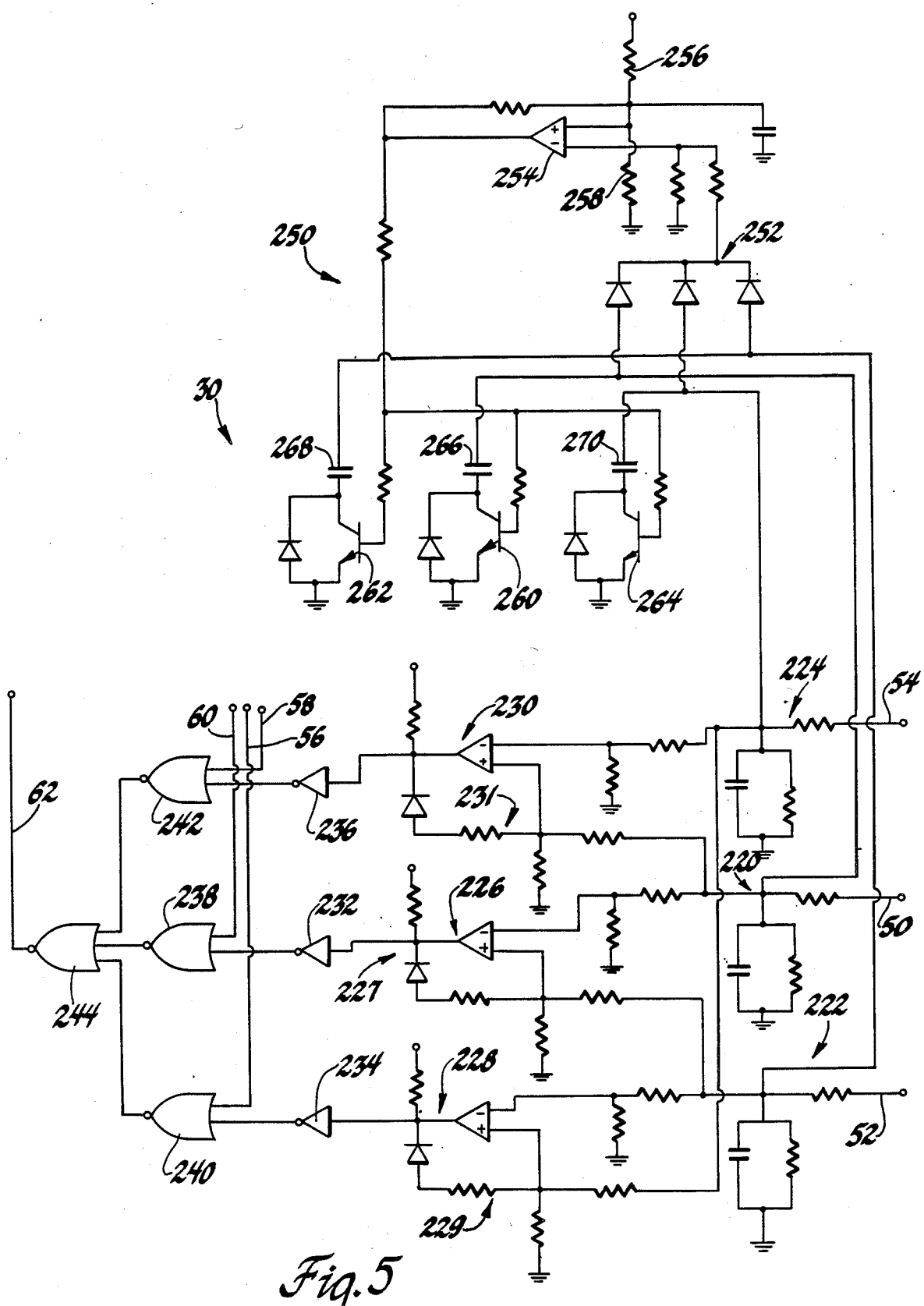

As will be described below, the elements 22-30 of FIG. 1 control the drivers D1-D3 for achieving the objects of this invention. The element 22 is a clock oscillator/divider, designated OSCILLATOR; the element 24 is a monostable multivibrator, designated MSMV; the element 26 is a divide-by-three ring counter, designated RING CTR; the element 28 is a current limit circuit, designated CURRENT LMT; and the element 30 is a generated voltage comparator, designated GVC. The OSCILLATOR 22 is depicted in detail in the circuit diagram of FIG. 3; the MSMV 24, the RING CTR 26, and the CURRENT LMT circuit 28 are depicted in detail in the circuit diagram of FIG. 4;

and the GVC circuit 30 is depicted in detail in the circuit diagram of FIG. 5.

In operation, OSCILLATOR 22 produces periodic output pulses on line 32 for triggering MSMV 24. After a predetermined delay, the MSMV 24 outputs a signal on line 34 for advancing RING CTR 26, and a signal on line 36 for resetting OSCILLATOR 22. The output of RING CTR 26 on lines 38-42 controls the operation of DRIVERS D1-D3 through the CURRENT LMT circuit 28 and lines 44-48. The CURRENT LMT circuit 28 also monitors the phase driver voltage signals via lines 50-54. It operates to interrupt the applied voltage whenever the voltage across the energized phase winding driver indicates that the winding current is in excess of a reference amount.

The phase winding driver signals on lines 50-54 are also applied to the GVC circuit 30. The GVC circuit 30 filters the voltage signals and compares the filtered signals representing the generated voltages across the deenergized phase windings to determine when the phase winding energization sequence should be advanced. The complement output of RING CTR 26 on lines 56-60 is used to select the proper voltage comparison. When the generated voltage signal of the phase winding about to be energized exceeds the generated voltage signal of the last energized phase winding, the GVC circuit 30 outputs a control signal on line 62 for triggering MSMV 24 and initiating advancement of the output of RING CTR 26.

Figure 2:
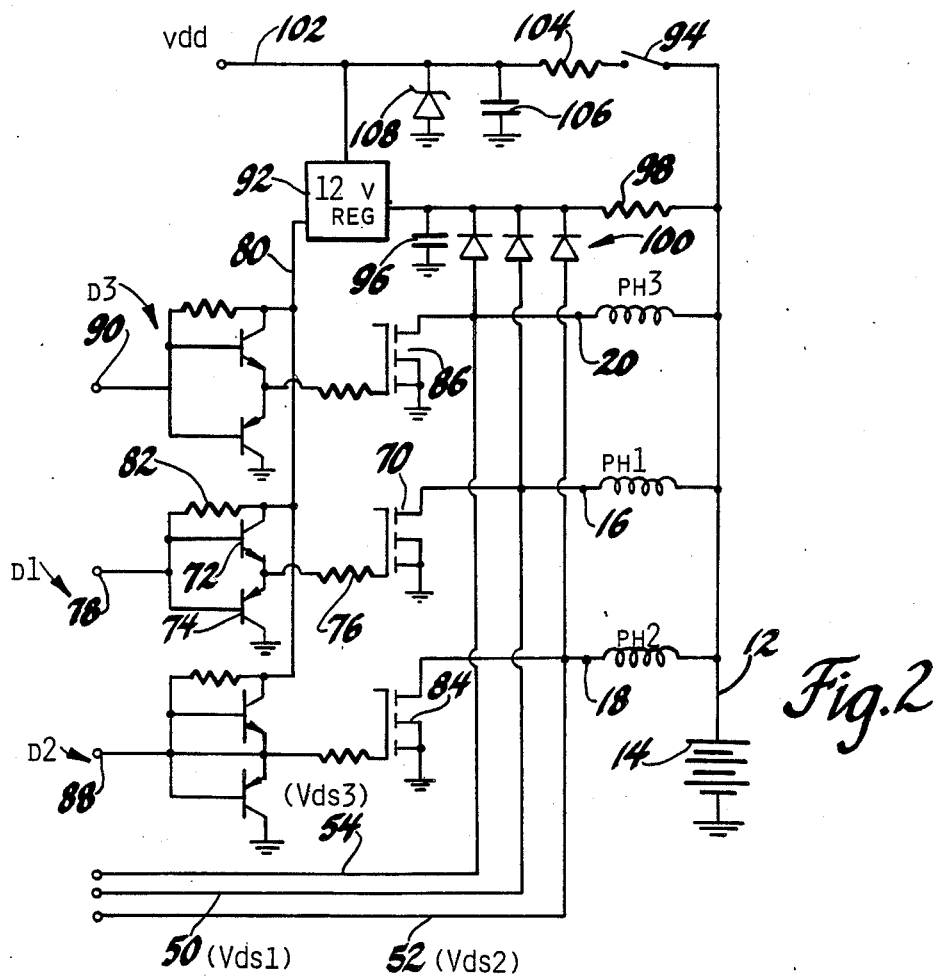

Referring now to FIG. 2 and the circuit diagram of drivers D1-D3, the reference numerals used in FIG. 1 have been repeated where appropriate. The driver D1 comprises a power MOSFET 70 and a pair of bipolar driver transistors 72 and 74. The driver transistors 72 and 74 are controlled by the potential at input terminal 78 to selectively apply a positive or ground potential to the MOSFET gate through resistor 76 to bias the MOSFET drain-to-source circuit conductive or nonconductive. The drain-to-source circuit is connected between the phase winding terminal 16 and ground potential so that the potential at input terminal 78 controls the energization of phase winding PH1.

A positive potential at input terminal 78 biases the driver transistor 72 conductive to apply the positive gate drive voltage on line 80 to the gate of MOSFET 70 through resistor 76 for energizing the phase winding PH1 with battery 14. A ground potential at input terminal 78 biases the driver transistor 74 conductive to apply ground potential to the gate of MOSFET 70 through resistor 76 for deenergizing the phase winding PH1. The resistor 82 provides the positive potential at input terminal 78.

Drivers D2 and D3 are not described in detail herein since each comprises components corresponding to those of Driver D1 described above. Thus, the energization of phase windings PH2 and PH3 are controlled by the power MOSFETs 84 and 86, which in turn, are controlled by the potential applied to the input terminals 88 and 90, respectively.

The gate drive voltage on line 80 is derived from the voltage regulator 92 so long as the switch 94 is closed, indicating that motor operation is desired. Initially, the gate drive voltage is provided by the battery 14, which charges the capacitor 96 through the resistor 98. Once the motor has started, however, the generated voltages of phase windings PH1-PH3 charge the capacitor 96 through the diode trio designated generally by the reference numeral 100. Capacitor 96 and resistor 98 also serve as a protective snubber circuit for absorbing inductive energy stored in the phase windings PH1-PH3 when the power MOSFETs 70, 84, or 86 are switched from conductive to nonconductive states.

A regulated system voltage designated $V_{dd}$ is provided on line 102 by applying the downstream side of switch 94 to conventional regulation elements comprising series resistor 104, shunt capacitor 106 and shunt Zener diode 108.

The phase winding voltage signals on lines 50-54 in FIG. 1 are actually the drain-to-source voltages of the power MOSFETs 70, 84, and 86. Such voltages are referred to herein as $V_{ds}1$, $V_{ds}2$, and $V_{ds}3$, and provide information concerning the current in an energized phase winding and the generated voltage in a deenergized phase winding. In the case of an energized phase winding, the drain-to-source voltage is directly proportional to the current therethrough; this information is utilized by CURRENT LMT circuit 28. In the case of a deenergized phase winding, the drain-to-source voltage varies in accordance with the difference $(V_b - V_g)$, where $V_b$ is the battery voltage, and $V_g$ is the generated, or back-EMF voltage. Thus, the drain-to-source voltage of a deenergized winding has an average value of $V_b$ and varies in inverse proportion to the generated voltage $V_g$. This information is utilized by GVC circuit 30 to effect synchronous advancement of RING CTR 26.

Figure 3:
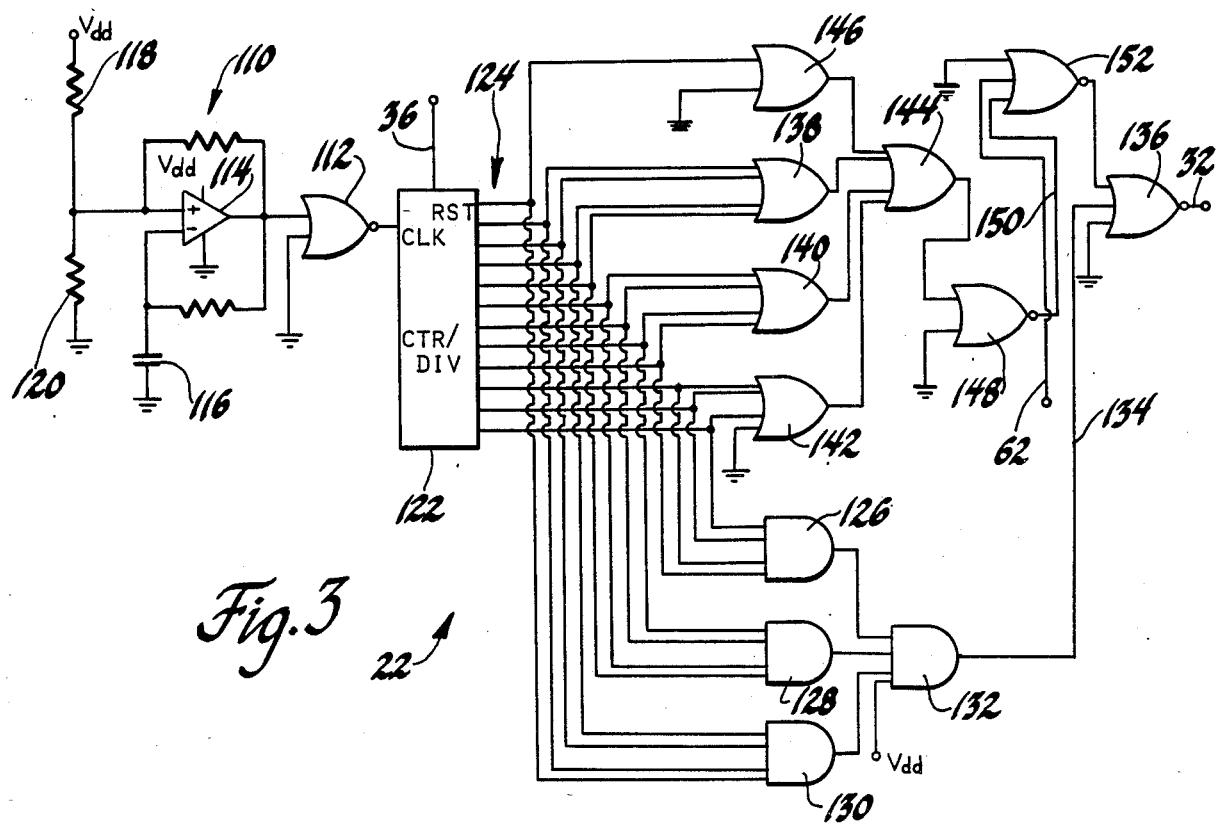

Referring now to FIG. 3 and the circuit diagram of OSCILLATOR 22, the reference numeral 110 generally designates a free running clock oscillator which produces a clock signal of approximately 4 kHz at the output of NOR-gate 112. Essentially, the comparator 114 compares the voltage across capacitor 116 with a reference voltage defined by the divider resistors 118-120. When the capacitor voltage is less than the reference, the output of comparator 114 is high to charge capacitor 116. When the capacitor voltage exceeds the reference, the output of comparator 114 is low to discharge capacitor 116.

The output of NOR-gate 112 clocks a counter/divider circuit 122, which has twelve (12) output lines designated generally by the reference numeral 124. The circuit 122 is illustrated as an RCA CD4040. The reset line 36 from MSMV 24 is connected to the reset input (RST) of counter/divider 122 as shown for resetting the output lines 124 whenever RING CTR 26 is clocked to advance the phase winding energization sequence.

The AND-gates 126-132 produce a step signal (0-to-1 transition) on line 134 4096 clock pulses after the occurrence of a reset pulse on line 36. Since the frequency of free running oscillator 110 is approximately 4 kHz, this condition occurs approximately 1.0 second following the reset. Line 134 is connected as an input to NOR-gate 136, the output of which is applied to MSMV 24 via line 32 as shown in FIG. 1. A 1-to-0 transition at the output of NOR-gate 136 triggers MSMV 24 to advance RING CTR 26 and reset counter/divider 122.

The OR-gates 138-144 and the NOR-gates 146-148 produce a skip signal (1-to-0 transition) on line 150 two clock pulse (approximately 0.50 msec) after the occurrence of a reset pulse on line 36. The line 150 is connected as an input to NOR-gate 152, which in turn, is connected as an input to NOR-gate 136. Accordingly, the 1-to-0 transition on line 150 produces a 1-to-0 transition on line 32, triggering MSMV 24 to advance RING CTR 26 and reset counter/divider 122.

As indicated in reference to FIG. 1, the output line 62 from GVC circuit 30 is also effective to trigger MSMV 24. Specifically, the line 62 is connected as an input to the NOR-gate 152, so that a 1-to-0 transition on line 62 triggers MSMV 24. Significantly, the skip signal on line 150 is blocked so long as line 62 is maintained at a high logic potential. As will be explained in reference to the GVC circuit diagram of FIG. 5, the skip signal on line 150 results in a trigger of MSMV 24 only when the motor rotor is turning in the wrong direction.

Figure 4:
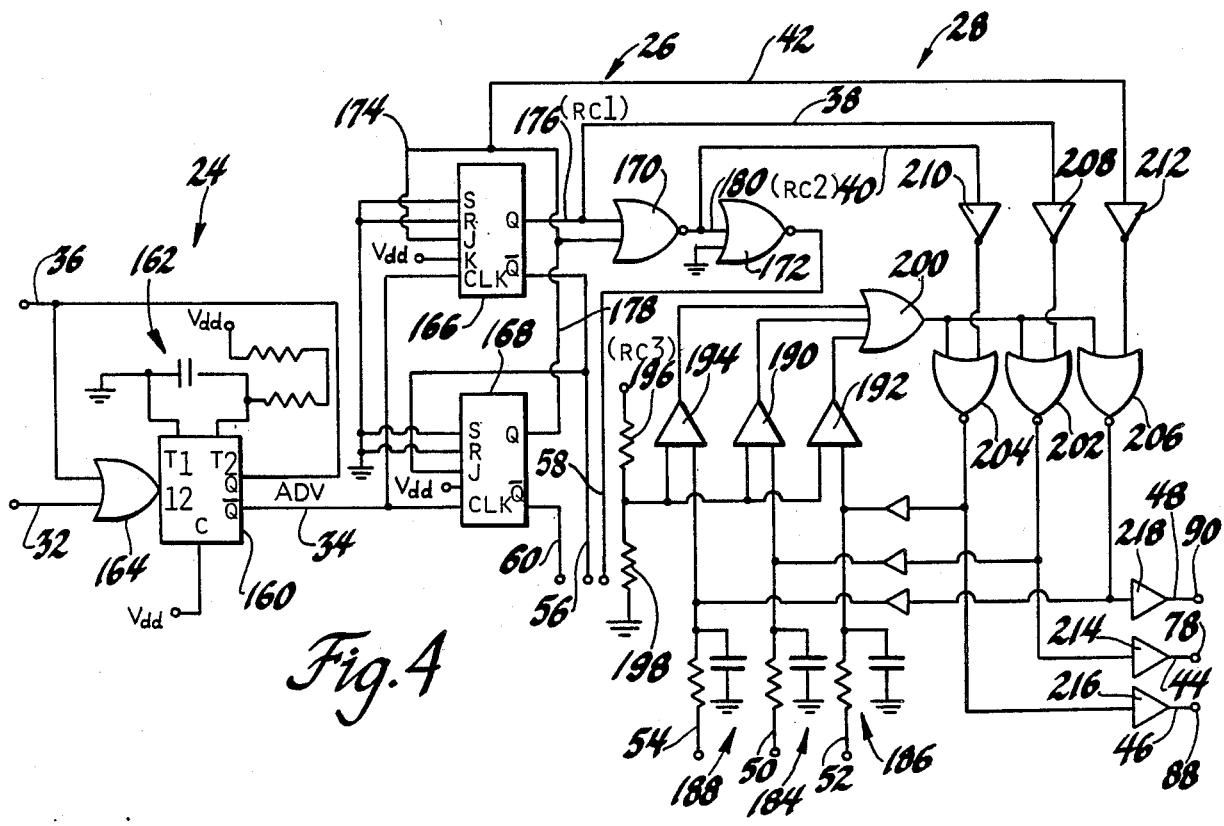

The circuit diagram of FIG. 4 depicts MSMV 24, RING CTR 26, and CURRENT LMT circuit 28. The various elements and lines corresponding to those depicted in FIG. 1 have been assigned the same reference numerals.

The MSMV 24 comprises a circuit 160 such as the RCA CD4538, and suitable RC elements 162 for adjusting the period of the output. The symbol 164 indicates that the circuit 160 is triggered by a trailing edge (1-to-0 transition) on line 32. When the circuit 160 is triggered by a 1-to-0 voltage transition on line 32, a pulse of predetermined duration (such as 0.5 ms) is generated on line 36 for resetting the counter/divider 122, and for preventing further triggering during the pulse. At the same time, an inverse pulse is generated on line 34 for clocking RING CTR 26.

The RING CTR 26 comprises two J-K flip-flops 166–168, which may be packaged in a single integrated circuit such as the RCA CD4027, and two NOR-gates 170–172. As indicated in reference to FIG. 1, the RING CTR 26 performs a divide-by-three function. A phase one output RC1 is generated at the Q output of flip-flop 166 on line 176; a phase three output RC3 is generated at the output of flip-flop 168 on line 178; and a phase two output RC2 is generated at the output of NOR-gate 170 on line 180. The outputs RC1–RC3 are generated in the order RC1-RC2-RC3-RC1 . . . , and are applied to the CURRENT LMT circuit 28 via lines 38, 40 and 42 as indicated in FIG. 1. The complement outputs $\overline{RC1}$–$\overline{RC3}$ are generated on lines 56–60, also as indicated in FIG. 1. The flip-flop 168 is triggered to advance the sequence of RING CTR 26 when MSMV 24 applies a leading edge (0-to-1 transition) on line 34. This occurs at the end of the pulse defined by MSMV 24.

The CURRENT LMT circuit 28 is responsive to the drain-to-source voltages $V_{ds}1$–$V_{ds}3$ on lines 50–54, the drain-to-source voltage of an energized phase winding being proportional to the winding current. Each of the voltages $V_{ds}1$–$V_{ds}3$ is filtered by an RC network 184–188, and applied to the noninverting input of a comparator 190–194. A reference voltage indicative of a current limit value is defined by the divider resistors 196–198, and applied to the inverting input of each comparator 190–194. The comparator outputs are connected as inputs to the OR-gate 200, the output of which is applied to each of the NOR-gates 202–206. The outputs RC1–RC3 of RING CTR 26 are inverted by the inverters 208–212, and also applied as inputs to NOR-gates 202–206, respectively. The outputs of NOR-gates 202–206 are applied through the buffer amplifiers 214–218 to the input lines 44–48 of drivers D1–D3.

If the current in an energized phase winding is less than the reference, the RING CTR outputs are passed through the inverters 208–212 and the NOR-gates 202–206 to the driver input lines 44–48. However, if the current in an energized phase winding exceeds the reference current, the output of NOR-gate 200 goes high, forcing the driver input lines 44–48 to a low potential to deenergize the respective phase winding. This condition may occur in normal operation, especially during starting when the generated voltage is very low, and results in a chopping of the applied voltage.

Referring now to FIG. 5 and the Generated Voltage Comparator (GVC) circuit 30, the various elements and lines corresponding to those depicted in FIG. 1 have been assigned the same reference numerals. Thus, the drain-to-source voltages $V_{ds}1$–$V_{ds}3$ are inputted via lines 50–54, the complement outputs $\overline{RC1}$–$\overline{RC3}$ of RING CTR 26 are inputted via lines 56–60, and the control signal for initiating the energization sequence advancement is outputted on line 62.

The phase winding voltages $V_{ds}1$–$V_{ds}3$ are filtered by the RC networks 220–224 and applied as inputs to the comparator circuits 226–230. The filtering introduces a delay or lag in the signal, but greatly increases the signal-to-noise ratio. This is important because the chopping of the applied voltage by CURRENT LMT circuit 28 introduces a substantial amount of noise on the signals $V_{ds}1$–$V_{ds}3$. The signals are especially noisy during starting since there is little or no generated voltage, and the applied voltage has to be chopped at a relatively high frequency to limit the winding current. This difficulty is further alleviated by the circuit 250, which is effective during starting to increase the filtering by connecting more capacitance in parallel with the RC networks 220–224.

The circuit 250 comprises diode trio 252, comparator 254, switching transistors 260–264, and capacitors 266–270. The diode trio 252 generates a voltage proportional to the motor speed, and the comparator 254 compares that voltage with a reference voltage defined by the divider resistors 256–258. During starting, the motor speed voltage is less than the reference, and the comparator 254 biases the transistors 260–264 conductive. This causes the capacitors 266–270 to be connected in parallel with the RC networks 220–224, respectively. When the motor speed increases, and the motor speed voltage rises above the reference voltage, the output of comparator 254 goes low, biasing the transistors 260–264 nonconductive.

Whether in start or run operation, the delay of filtering is not detrimental to the motor operation since the rotor position information is obtained from the filtered signals prior to the point at which the energization sequence needs to be advanced. When the position information is obtained, MSMV 24 is triggered to introduce a further predetermined delay before advancing RING CTR 26.

The comparator circuit 230 compares $V_{ds}1$ with $V_{ds}3$ and initiates the advancement of RING CTR 26 for energizing phase winding PH3; the comparator circuit 226 compares $V_{ds}2$ with $V_{ds}1$ and initiates the advancement of RING CTR 26 for energizing phase winding PH1; and the comparator circuit 228 compares $V_{ds}3$ with $V_{ds}2$ and initiates the advancement of RING CTR 26 for energizing phase winding PH2. Comparators 226, 228, and 230 are each biased toward a low output state by a unidirectional resistor feedback circuit 227, 229, or 231. The output of each comparator circuit 226–230 is applied through an inverter 232–236 to a NOR-gate 238–242. The inputs $\overline{RC1}$–$\overline{RC3}$ are also applied as inputs to the NOR-gates 238–242. The outputs of NOR-gates 238–242 are connected as inputs to NOR-gate 244, the output of which is connected to line 62.

The complement input $\overline{RC1}$ selects the output of comparator 228 when phase winding PH1 is energized. In such case, $\overline{RC1}$ is low to enable the NOR-gate 240; $\overline{RC2}$ and $\overline{RC3}$ are high to block the NOR-gates 238 and 242. If the motor rotor is turning in the correct direction, $V_{ds}2$ is initially greater than $V_{ds}3$. When $V_{ds}2$ falls below $V_{ds}3$, the outputs of comparator 228 and NOR-gate 240 undergo a 0-to-1 voltage transition. The output of NOR-gate 244 on line 62 undergoes a 1-to-0 transition, triggering MSMV 24, and initiating the advance of RING CTR 26 for energizing phase winding PH2. The phase winding PH2 is actually energized after the predetermined delay defined by MSMV 24.

Similarly, the complement input $\overline{RC2}$ selects the output of comparator 230 when phase winding PH2 is energized. In such case, $\overline{RC2}$ is low to enable the NOR-gate 242; $\overline{RC1}$ and $\overline{RC3}$ are high to block the NOR-gates 238 and 240. If the motor rotor is turning in the correct direction, $V_{ds}3$ is initially greater than $V_{ds}1$. When $V_{ds}3$ falls below $V_{ds}1$, the outputs of comparator 230 and NOR-gate 242 undergo a 0-to-1 voltage transition. The output of NOR-gate 244 on line 62 undergoes a 1-to-0 transition, triggering MSMV 24, and initiating the advance of RING CTR 26 for energizing phase winding PH3. The phase winding PH3 is actually energized after the predetermined delay defined by MSMV 24.

Similarly, the complement input $\overline{RC3}$ selects the output of comparator 226 when phase winding PH3 is energized. In such case, $\overline{RC3}$ is low to enable the NOR-gate 238; $\overline{RC1}$ and $\overline{RC2}$ are high to block the NOR-gates 240 and 242. If the motor rotor is turning in the correct direction, $V_{ds}1$ is initially greater than $V_{ds}2$. When $V_{ds}1$ falls below $V_{ds}2$, the outputs of comparator 226 and NOR-gate 238 undergo a 0-to-1 voltage transition. The output of NOR-gate 244 on line 62 undergoes a 1-to-0 transition, triggering MSMV 24, and initiating the advance of RING CTR 26 for energizing phase winding PH1. The phase winding PH1 is actually energized after the predetermined delay defined by MSMV 24.

Figure 6:
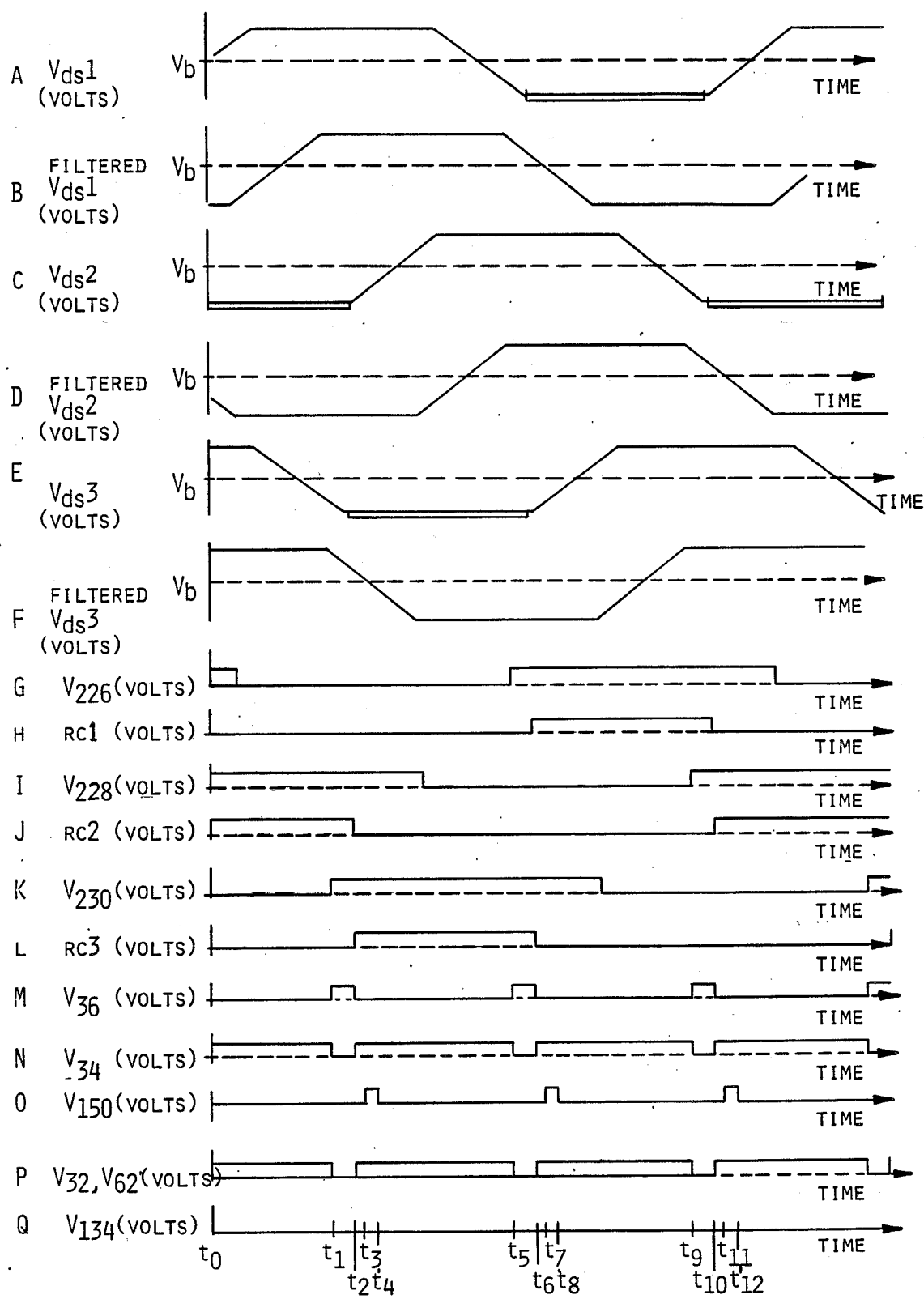
FIGS. 6-7 are graphs depicting the operation of the sensorless motor controller of FIGS. 1-5.

The operation of the controller during normal run operation in the correct direction is graphically depicted in FIG. 6. Graphs A–B depict the voltage signal $V_{ds}1$ before and after the filtering of GVC circuit 30; Graphs C–D depict the voltage $V_{ds}2$ before and after the filtering of GVC circuit 30; and Graphs E–F depict the voltage $V_{ds}3$ before and after the filtering of GVC circuit 30. Note the delay or lag of the filtered signals with respect to the unfiltered signals. Graphs G, I and K depict the output voltages $V_{226}$, $V_{228}$ and $V_{230}$ of comparators 226, 228, and 230, respectively. Graphs H, J and L depict the output signals RC1, RC2 and RC3 of RING CTR 26. Graphs M and N depict the output signals of MSMV 24 on lines 36 and 34, respectively. Graph O depicts the output voltage $V_{150}$ of skip channel NOR-gate 148 on line 150, Graph P depicts the trigger signal $V_{32}$ applied to MSMV 24 on line 32, and Graph Q depicts the output voltage $V_{134}$ of step channel AND-gate 132 on line 134. Graph P is also representative of the output voltage $V_{62}$ of GVC circuit NOR-gate 244 since such voltage coincides with the MSMV trigger input when the motor rotor is turning in the desired direction.

Consider the state of the controller at time $t_0$ when RC2 is high (Graph J) and phase winding PH2 is energized. At such time the unfiltered voltage $V_{ds}2$ (Graph C) is near ground potential, and the unfiltered voltages $V_{ds}1$ (Graph A) and $V_{ds}3$ (Graph E) are varying in accordance with the voltages generated in the phase windings PH1 and PH3. The voltage $V_b$ represents the terminal voltage of battery 14. The comparator 230 (Graph K) compares the filtered voltage $V_{ds}1$ (Graph B) with the filtered voltage $V_{ds}3$ (Graph F).

At time $t_1$, the filtered voltage $V_{ds}1$ (Graph B) exceeds the filtered voltage $V_{ds}3$ (Graph F), and the comparator output signal $V_{230}$ (Graph K) undergoes a 0-to-1 transition to produce a trigger pulse (Graph P) for MSMV 24 on line 32. The predetermined delay of MSMV 24 terminates at time $t_2$. The 0-to-1 transition on line 34 (Graph N) clocks RING CTR 26, and the 1-to-0 transition on line 36 resets the counter/divider 122. Thereafter, RC3 is high (Graph L) to energize phase winding PH3, and comparator 226 (Graph G) compares the filtered voltage $V_{ds}2$ (Graph D) with the filtered voltage $V_{ds}1$ (Graph B). Initially, the filtered voltage $V_{ds}1$ is greater than the filtered voltage $V_{ds}2$, and the output of comparator 226 (Graph G) is low. The OSCILLATOR 22 generates a skip pulse (Graph O) in the interval $t_3-t_4$, but the pulse is ineffective to trigger MSMV 24 since the NOR-gate 152 is blocked by the high potential $V_{62}$ on line 62 (Graph P) of NOR-gate 244.

At time $t_5$, the filtered voltage $V_{ds}2$ (Graph D) exceeds the filtered voltage $V_{ds}1$ (Graph B), and the comparator output signal $V_{226}$ (Graph G) undergoes a 0-to-1 transition to produce a trigger pulse (Graph P) for MSMV 24 on line 32. The predetermined delay of MSMV 24 terminates at time $t_6$. The 0-to-1 transition on line 34 (Graph N) clocks RING CTR 26, and the 1-to-0 transition on line 36 resets the counter/divider 122. Thereafter, RC1 is high (Graph H) to energize phase winding PH1, and comparator 228 (Graph I) compares the filtered voltage $V_{ds}2$ (Graph D) with the filtered voltage $V_{ds}3$ (Graph F). Initially, the filtered voltage $V_{ds}2$ is greater than the filtered voltage $V_{ds}3$, and the output of comparator 228 (Graph I) is low. The OSCILLATOR 22 generates a skip pulse (Graph O) in the interval $t_7-t_8$, but the pulse is ineffective to trigger MSMV 24 since the NOR-gate 152 is blocked by the high potential $V_{62}$ on line 62 (Graph P) of NOR-gate 244.

At time $t_9$, the filtered voltage $V_{ds}3$ (Graph F) exceeds the filtered voltage $V_{ds}2$ (Graph D), and the comparator output signal $V_{228}$ (Graph I) undergoes a 0-to-1 transition to produce a trigger pulse (Graph P) for MSMV 24 on line 32. The predetermined delay of MSMV 24 terminates at time $t_{10}$. The 0-to-1 transition on line 34 (Graph N) clocks RING CTR 26, and the 1-to-0 transition on line 36 resets the counter/divider 122. Thereafter, RC2 is high (Graph J) to reenergize phase winding PH2, and as above, comparator 230 (Graph K) compares the filtered voltage $V_{ds}1$ (Graph B) with the filtered voltage $V_{ds}3$ (Graph F). Initially, the filtered voltage $V_{ds}3$ is greater than the filtered voltage $V_{ds}1$, and the output of comparator 230 (Graph K) is low. The OSCILLATOR 22 skip pulse (Graph O) in the interval $t_{11}-t_{12}$ is ineffective to trigger MSMV 24 since the NOR-gate 152 is blocked by the high potential $V_{62}$ on line 62 (Graph P) of NOR-gate 244.

The graphs of FIG. 6 also illustrate the starting operation of the motor, assuming that the rotor starts turning in the desired direction upon the initial energization of phase winding PH2. In such event, the controller operates essentially the same as in the run mode, and the rotor is accelerated to its running speed.

If, on the other hand, the motor rotor fails to turn when the initial winding is energized, there are no generated voltages, and the GVC circuit 30 does not trigger MSMV 24 to advance RING CTR 26. Moreover, the GVC circuit 30 blocks the skip pulse on line 150, and nothing happens until a step pulse is generated on line 134. At that point, MSMV 24 is triggered to advance RING CTR 26, and the next sequential phase winding is energized. If no rotor movement is sensed, the controller will continue to step the output of RING CTR 26 at a frequency of approximately 1 Hz in an attempt to free the rotor.

In starting the motor, the first energized phase winding may produce rotation in the wrong direction since the energization is made without knowledge of the rotor position. In such event, the controller elements operate according to this invention to detect the improper rotation, and to synchronously brake the rotor so that starting may be attempted again. In cooling fan applications where the rotor may be freewheeling in the wrong direction when motor operation is required, the controller of this invention first synchronously brakes the rotor substantially to a stop before attempting to start it in the desired direction.

Figure 7:
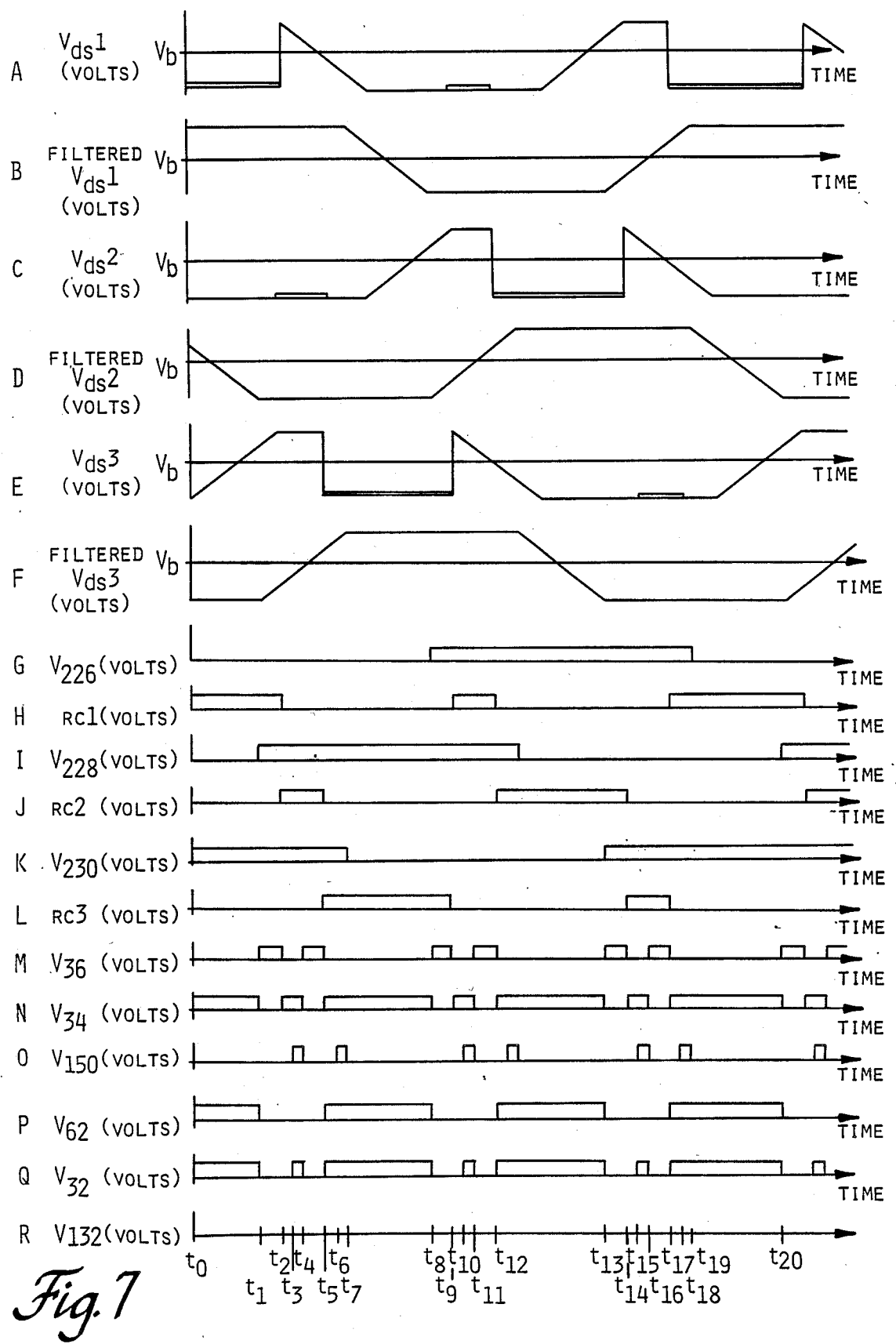

The operation of the controller when the motor rotor is turning in the reverse or wrong direction is graphically depicted in FIG. 7. The various graphs of FIG. 7 depict the same signals as the corresponding graphs of FIG. 6, with the exception of Graphs P–R. Graph P depicts the output voltage $V_{62}$ of NOR-gate 244 on line 62; Graph Q depicts the trigger voltage $V_{32}$ for MSMV 24; and Graph R depicts the step channel voltage $V_{132}$ on line 132. Analogously to FIG. 6, the graphs of FIG. 7 represent the operation of the controller when the rotor is turning in the wrong direction, either because of freewheeling prior to starting, or because the initial phase winding energization produced torque in the wrong direction.

Consider the state of the controller at time $t_0$ when RC1 (Graph H) is high and phase winding PH1 is energized. At such time the unfiltered voltage $V_{ds}1$ (Graph A) is near ground potential, and the unfiltered voltages $V_{ds}2$ (Graph C) and $V_{ds}3$ (Graph E) are varying in accordance with the voltages generated in the phase windings PH2 and PH3. The comparator 228 (Graph I) compares the filtered voltage $V_{ds}2$ (Graph D) with the filtered voltage $V_{ds}3$ (Graph F). Initially, $V_{ds}2$ is greater than $V_{ds}3$, and the output of comparator 228 is low.

At time $t_1$, the filtered voltage $V_{ds}3$ (Graph F) exceeds the filtered voltage $V_{ds}2$ (Graph D), and the comparator output signal $V_{228}$ (Graph I) undergoes a 0-to-1 transition to produce a 1-to-0 transition on lines 62 (Graph P) and 32 (Graph Q). The transition on line 32 triggers MSMV 24, which after a predetermined delay, clocks RING CTR 26, and resets the counter/divider 122 at time $t_2$. At such time, RC2 becomes high (Graph J) to energize phase winding PH2, and comparator 230 (Graph K) compares the filtered voltage $V_{ds}1$ (Graph B) with the filtered voltage $V_{ds}3$ (Graph F). Due to the reverse rotation, however, the filtered voltage $V_{ds}1$ is greater than the filtered voltage $V_{ds}3$. As a result, the comparator output is high, and line 62 is held at a low logic potential. This permits NOR-gate 152 to pass a skip pulse on line 150 to line 32 (Graph Q). A skip pulse is generated (Graph O) in the interval $t_3-t_4$, and MSMV 24 is triggered on the trailing edge thereof at time $t_4$. Following the predetermined delay of MSMV 24 at time $t_5$, the 0-to-1 transition on line 34 (Graph N) advances RING CTR 26, and the 1-to-0 transition on line 36 (Graph M) resets counter/divider 122. At such time, the RING CTR output RC3 becomes high, and phase winding PH3 is energized.

Once RC3 (Graph L) becomes high at time $t_5$ to energize phase winding PH3, comparator 226 (graph G) compares the filtered voltage $V_{ds}1$ (graph B) with the filtered voltage $V_{ds}2$ (Graph D). Initially, the filtered voltage $V_{ds}1$ is greater than the filtered voltage $V_{ds}2$. As a result, the comparator output is low, and line 62 (Graph P) is driven to a high logic potential to block the NOR-gate 152. When a skip pulse (Graph O) is generated in the interval $t_6-t_7$, it is blocked by NOR-gate 152, and is ineffective to trigger MSMV 24. As such, phase winding PH3 remains energized until time $t_8$ when the filtered voltage $V_{ds}2$ (Graph D) exceeds the filtered voltage $V_{ds}1$ (Graph B). At such time, the comparator output signal $V_{226}$ (Graph G) undergoes a 0-to-1 transition to produce a trigger pulse (Graph Q) for MSMV 24 on line 32. The predetermined delay of MSMV 24 terminates at time $t_9$, at which time the 0-to-1 transition on line 34 (Graph N) clocks RING CTR 26, and the 1-to-0 transition on line 36 resets the counter/divider 122. Thereafter, RC1 is high (Graph H) to reenergize phase winding PH1, and as above, comparator 228 (Graph I) compares the filtered voltage $V_{ds}2$ (Graph D) with the filtered voltage $V_{ds}3$ (Graph F).

Due to the reverse rotation, the filtered voltage $V_{ds}3$ is greater than the filtered voltage $V_{ds}2$, and the output of comparator 228 output is high. As a result, line 62 is held at a low logic potential, permitting NOR-gate 152 to pass a skip pulse on line 150 to line 32 (Graph Q). A skip pulse is generated (Graph O) in the interval $t_{10}-t_{11}$, and MSMV 24 is triggered on the trailing edge thereof. Following the predetermined delay of MSMV 24 at time $t_{12}$, the 0-to-1 transition on line 34 (Graph N) advances RING CTR 26, and the 1-to-0 transition on line 36 (Graph M) resets counter/divider 122. At such time, the RING CTR output RC2 becomes high, and phase winding PH2 is energized.

A continuing analysis will show that winding PH2 is energized for a full period $t_{12}-t_{14}$, and that the subsequent energization of winding PH3 is interrupted shortly after its initiation at time $t_{17}$.

In view of the above, it will be seen that the energization sequence effected by the controller of this invention depends on the direction of rotation of the motor rotor. When the motor rotor turns in the correct (desired) direction, the voltages generated in the deenergized phase windings assume a relative relationship which blocks the passage of all skip pulses generated on line 150. As illustrated in FIG. 6, the energization sequence in this event is PH1-PH2-PH3-PH1 . . . With forward motor rotation, this energization sequence serves to generate positive torque in synchronism with the rotor position for accelerating the rotor to its running speed.

When the motor rotor turns in the wrong direction, the voltages generated in the deenergized phase windings assume a different relative relationship, such that alternately generated skip pulses are passed to MSMV 24 to interrupt the energization of the energized phase winding. As illustrated in FIG. 7, the energization sequence in such case is PH1-PH3-PH2-PH1 . . . With reverse motor rotation, this energization sequence serves to generate negative torque in synchronism with the rotor position for decelerating or braking the rotor substantially to a stop.

When the rotor is turning in reverse, the energization period of the interrupted phases is so brief relative to the uninterrupted phases that it can be neglected from the standpoint of torque production. As an example, the period of an interrupted energization is about 1.5 ms in the illustrated embodiment, while the period of an uninterrupted energization is in the range of 500–1000 ms for motor speeds where reverse rotation occurs.

It will be recognized, of course, that the present invention is not meant to be limited to the specific mechanization illustrated herein. It may, for example, be mechanized with a single custom integrated circuit, or a computer-based control unit. Furthermore, a plurality of operating speeds may be provided by suitably modulating the applied voltage. Various other modifications will occur to those skilled in the art, and it should be understood that controllers incorporating such modification may fall within the scope of this invention, which is defined by the appended claims.

The embodiments of the invention in which an exclusive property or privilege is claimed are defined as follows:

1. For a brushless DC motor having a permanent magnet rotor, and three phase stator windings energizable to develop a magnetic field for producing torque for rotating the rotor, a controller for energizing the phase windings with a source of direct current for initiating the rotation of the rotor in a desired direction without the use of rotor position sensors, such controller comprising:

counter means defining a phase winding energization sequence corresponding to the sequence of generated voltages which occurs in said phase windings when the rotor is turning in the desired direction, such counter means being effective when clocked to deenergize the currently energized phase winding and energize the next winding of the energization sequence;

synchronous acceleration means effective if at the initiation of the current winding energization, the generated voltage in the next winding of the energization sequence is less than the generated voltage in the previous winding of the energization sequence, thereby indicating that the rotor is turning in the desired direction, for permitting the energization to continue, and thereafter for clocking the counter means in relation to the point at which the generated voltage in such next winding of the sequence becomes greater than the generated voltage in such previous winding of the sequence, whereby such energization produces positive synchronous torque if the rotor is turning in the desired direction; and synchronous deceleration means effective if at the initiation of the current winding energization, the generated voltage in the next winding of the energization sequence is already greater than the generated voltage in the previous winding of the energization sequence, thereby indicating that the rotor is turning in the wrong direction and that such energization is producing positive torque for accelerating the rotor in the wrong direction, for clocking the counter means substantially without delay, whereby if the rotor is turning in the wrong direction, the production of positive torque is interrupted, and the energization sequence is effectively reversed to produce synchronous negative torque by energizing the next winding of the sequence.

2. For a brushless DC motor having a permanent magnet rotor, and three phase stator windings energizable to develop a magnetic field for producing torque for rotating the rotor, a method of energizing the phase windings with a source of direct current for initiating the rotation of the rotor in a desired direction without the use of rotor position sensors, such method comprising the steps of:

defining a phase winding energization sequence corresponding to the sequence of generated voltages which occurs in said phase windings when the rotor is turning in the desired direction;

initially energizing a given one of said phase windings without knowledge of the rotor position or direction of rotation, and comparing the generated voltages thereby produced in the two deenergized phase windings;

continuing the energization of said given phase winding until a time determined in relation to the point at which the generated voltage in the next winding of the energization sequence becomes greater than the generated voltage in the previous winding of the energization sequence, if upon energization of the given phase winding, the generated voltage in such next winding is less than the generated voltage in such previous winding, thereby indicating that the rotor is turning in the desired direction, whereby the energization of said given winding produces synchronous positive torque for accelerating the rotor if such energization causes the rotor to turn in the desired direction; and interrupting the energization of said given phase winding substantially without delay and energizing the next winding of the energization sequence, if upon energization of the given phase winding, the generated voltage in the next winding of the energization sequence is already greater than the generated voltage in the previous winding of the energization sequence, thereby indicating that the rotor is turning in the wrong direction and that the energization of the given winding is producing positive torque for accelerating the rotor in the wrong direction, whereby the defined energization sequence is effectively reversed to produce synchronous negative torque for decelerating the rotor if the energization of the given winding causes the rotor to turn in the wrong direction.

* * * * *